(12) United States Patent
Goel et al.

(10) Patent No.: US 9,049,189 B2
(45) Date of Patent: Jun. 2, 2015

(54) MULTI-CONTROL PASSWORD CHANGING

(71) Applicants: Anil Goel, Waterloo (CA); Ramesh Gupta, Pune (IN); Asif Iqbal Desai, Pune (IN); Vivek Kandiyanallur, Bangalore (IN); Somnath Ghosh, Pune (IN)

(72) Inventors: Anil Goel, Waterloo (CA); Ramesh Gupta, Pune (IN); Asif Iqbal Desai, Pune (IN); Vivek Kandiyanallur, Bangalore (IN); Somnath Ghosh, Pune (IN)

(73) Assignee: Sybase, Inc., Dublin, CA (US)

( * ) Notice: Subject to any disclaimer, the term of this patent is extended or adjusted under 35 U.S.C. 154(b) by 107 days.

(21) Appl. No.: 13/728,803

(22) Filed: Dec. 27, 2012

(65) Prior Publication Data

US 2014/0109206 A1    Apr. 17, 2014

Related U.S. Application Data

(60) Provisional application No. 61/713,442, filed on Oct. 12, 2012, provisional application No. 61/713,578, filed on Oct. 14, 2012.

(51) Int. Cl.
*G06F 17/30* (2006.01)
*H04L 29/06* (2006.01)
*G06F 21/45* (2013.01)

(52) U.S. Cl.
CPC .............. *H04L 63/083* (2013.01); *H04L 63/20* (2013.01); *G06F 21/45* (2013.01)

(58) Field of Classification Search
CPC .............................. G06F 21/46; H04L 63/083
See application file for complete search history.

(56) References Cited

U.S. PATENT DOCUMENTS

| 2008/0301791 A1* | 12/2008 | Smith et al. ....................... 726/7 |
| 2009/0100530 A1* | 4/2009 | Chen ............................... 726/29 |
| 2010/0031343 A1* | 2/2010 | Childress et al. ............... 726/18 |

* cited by examiner

*Primary Examiner* — Andrew Nalven
*Assistant Examiner* — Mohammed Waliullah
(74) *Attorney, Agent, or Firm* — Sterne, Kessler, Goldstein & Fox P.L.L.C.

(57) ABSTRACT

Multi-control password changing includes initiating a password change cycle to change a target user's password, selecting a plurality of administrators to provide password part inputs, receiving password part inputs separately and confidentially from the plurality of administrators, generating a multi-control password comprised of multiple password part inputs, changing the target user's password to the multi-control password, and transmitting either the single multi-control password or multiple password parts each separately to target user. In an exemplary embodiment, a system for multi-control password changing includes a multi-control password changing module configured to change a target user's password, a recruitment module configured to select a plurality of administrators to provide password part inputs, a regulation module configured to receive and process password part inputs from the plurality of administrators, and a change value module configured to generate a multi-control password comprised of multiple password part inputs.

20 Claims, 6 Drawing Sheets

MULTI-CONTROL PASSWORD CHANGING

CROSS-REFERENCE TO RELATED APPLICATIONS

This application claims the benefit of U.S. Provisional Application No. 61/713,442, filed Oct. 12, 2012, and U.S. Provisional Application No. 61/713,578, filed Oct. 14, 2012, which are hereby incorporated by reference in their entirety.

TECHNICAL FIELD

Embodiments herein relate generally to secure login solutions for users of computers and systems, and more particularly to changing passwords.

BACKGROUND

Sending, receiving, and retrieving data over networks, to and from secured systems, generates the need to control access and enforce security policies. To control access, secured systems, such as databases and servers, implement login procedures that require authentication by providing the authenticating system with information that will positively identify the target user. This information may take the form of a user account and password. Once a password is assigned to a target user account, the user can login by providing the authenticating system with the matching password.

However, passwords must be known only to the target user if they are to fulfill their purpose of positively authenticating the target user. Maintaining a high level of password security presents a variety of challenges. For example, use of a static, reusable password renders it vulnerable to hijacking. Misappropriation of a password can result in substantial harm to the secured system, for example, where an unauthorized entity obtains privileges and access to data. This danger becomes particularly acute for users with the privilege to access sensitive or highly secured data. To mitigate this risk, users are advised to regularly change their passwords.

A system administrator may be given authority to change user passwords. For example, a system administrator interacts with the authenticating system to configure and set or reset password values for a target user. However, this routine poses an independent security threat. Namely, knowledge of the password by an entity that is not the target user, in this case, by the system administrator. These routines assume that a system administrator can be trusted with this knowledge; however, this assumption compromises security.

Moreover, where access control systems restrict access based on identity, a system administrator (e.g., an information technology engineer in a Help Desk department), having fewer access privileges than a given user, may be authorized to change passwords. This inequality in access privilege creates incentives for the system administrator, or a similarly authorized entity, to misappropriate password information. Such incentives increase as access privileges of the user increase and the corresponding security risk to the secured system is thus compounded.

In view of these vulnerabilities, and in order to reduce the risk of password hijacking, what is needed is an improved way to change passwords.

BRIEF SUMMARY

Provided herein are system, method and/or computer program product embodiments, and/or combinations and subcombinations thereof, for multi-control password changing.

An example embodiment includes selecting a plurality of administrators to provide password part inputs, receiving password part inputs separately and confidentially from the plurality of administrators, generating a multi-control password comprised of multiple password part inputs, changing a target user's password to the multi-control password, and communicating the single multi-control password or multiple password parts separately to the target user.

Further features and advantages of the disclosed embodiments, as well as the structure and operation of various embodiments, are described in detail below with reference to the accompanying drawings. The disclosure is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

The accompanying drawings, which are incorporated herein and form part of the specification, illustrate exemplary embodiments and, together with the description, further serve to explain various underlying principles and enable a person skilled in the relevant arts to make and use the embodiments.

In general, like reference numbers indicate identical and/or functionally similar elements. Additionally, the left-most digit of a reference number identifies the drawing in which the reference number first appears.

DETAILED DESCRIPTION

Figure 1:
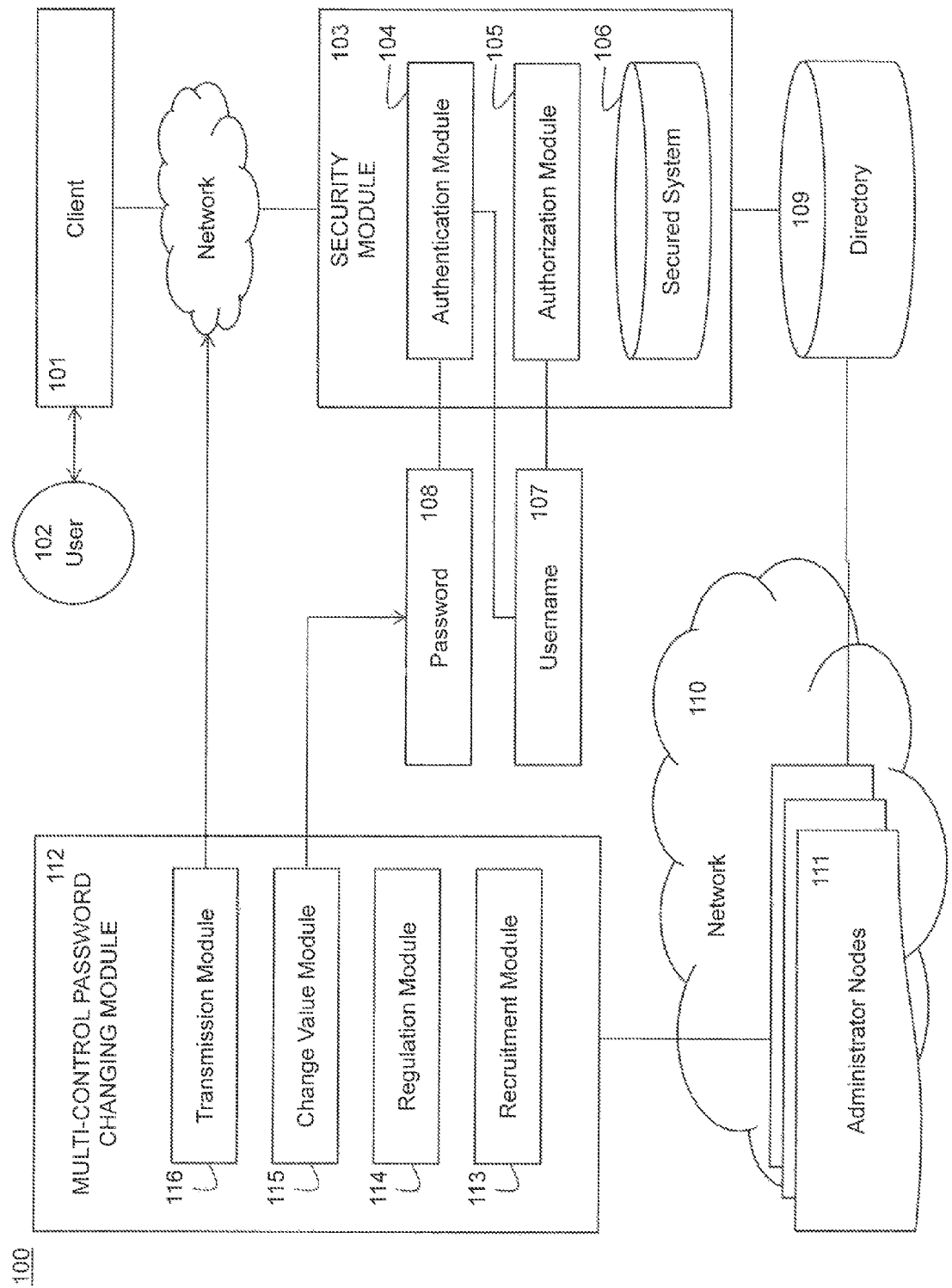
FIG. 1 is a diagram illustrating an enterprise network and multi-control password changing system, in accordance with an exemplary embodiment.

The following detailed description refers to the accompanying drawings to illustrate various exemplary embodiments. Other embodiments are possible, and modifications can be made to the embodiments within the spirit and scope of this disclosure. It will be apparent to one of skill in the art that such embodiments can be implemented in different embodiments of software, hardware, firmware, and/or processing unit. Any code or syntax used to describe embodiments does not limit such embodiments to specialized hardware, firmware, software, or processing unit capable of executing such code or syntax. Furthermore, the operational behavior of such embodiments will be described herein with the understanding that various modifications and variations of the embodiments are possible.

Any reference to modules in this specification and the claims means any combination of hardware or software components for performing the intended function. A module need not be a rigidly defined entity, such that several modules may overlap hardware and software components in functionality. For example, a module may refer to a single line of code within a procedure, the procedure itself being a separate module. One skilled in the relevant arts will understand that the functionality of modules may be defined in accordance with a number of stylistic or performance-optimizing techniques, for example. One skilled in the relevant arts will also understand that modules, alone or in combination may share a same physical and/or distributed domain, such as, for example a server, memory, computer-readable media, and the like, as separate software components therein, or may be compiled as a single application. Thus, it is understood that multi-control password changing may be disposed in a number of different locations.

A password is discussed herein to describe data capable of authenticating a target user to a system. However, operation of the disclosed embodiments is not limited to use of a password, and the disclosure contemplates any other suitable mechanisms for authenticating a user to a system, such as, for example, use of passphrases, personal identification numbers, graphical authentication methods, 2-dimensional keys, tokens, cognitive and interactive authentication methods, and any combination thereof. Access control enforced using password protection may involve preserving password confidentiality.

Advantages of multi-control password changing include the possibility of distributing tasks associated with the execution of a password change among a plurality of system administrators, for example, by allowing each administrator to set a part of the final password, thereby protecting and preserving password confidentiality. Various embodiments may thus avoid the situation arising when an administrator, tasked with changing a password, knows the changed password.

Similarly, an advantage of multi-control password changing includes providing that no single entity, except the target user whose password is being changed, possesses complete knowledge of the changed password. Embodiments may thus achieve the principle of separation of duties. The principle of separation of duties sets forth that, for particular sets of operations, no single entity should be permitted to execute all operations within the set.

FIG. 1 illustrates an enterprise network 100, according to an exemplary embodiment. Enterprise network 100 may include one or more client nodes 101 capable of interacting with one or more target users 102.

In an exemplary embodiment, client node 101 interfaces with local and/or shared resources, such as, for example, a secured system 106. Secured system 106 may comprise one or more servers, databases, information domains, networks, intranets, computer systems, information assets, or any combination thereof.

In an exemplary embodiment, secured system 106 and related controls and support are furnished by architecture that may involve shared and/or local storage, such as, for example, SAP SYBASE IQ MULTIPLEX architecture.

In an exemplary embodiment, target user 102 accesses secured system 106 by providing credentials, such as, for example, a user name 107 and a password 108 to a security module 103 as part of a login routine. Username 107 is uniquely associated with target user 102 and password 108 is associated with username 107. Target user 102 may proceed with a login routine by interacting with client node 101. Target user 102 inputs username 107 and password 108 into client node 101 which provides password 108 to security module 103.

In an exemplary embodiment, the dual credentials of password 108 and username 107 associated with target user 102 are verified by an authentication module 104 which grants permission to access secured system 106. Permission is granted in accordance with privileges assigned to username 107 by, for example, administrator node 111. Permissions assigned to a target user 102 may be stored and/or processed by an authorization module 105.

In an exemplary embodiment, security module 103 is configured to authenticate and authorize username 107 and password 108 for a target user 102 prior to granting access to secured system 106 and/or completing a login routine.

In an exemplary embodiment, an authentication module 104 determines if password 108 matches a stored value capable of being verified by, for example, comparing password 108 to, for example, an active record, a log file, a database, a directory, a cache, and/or any domain capable of storing such data. Security module 103 may read, write, and/or delete password values, such as, for example, password 108. By way of example, not of limitation, authentication module 104 is enabled each time target user 102 attempts to login to secured system 106. When enabled, authentication module 104 executes one or more processes to perform authentication, for example, by verifying password 108. Authentication module 104 permits a login routine to proceed and/or sends an error message when, for example, a login condition is not met and/or requires additional input.

In an exemplary embodiment, security module 103 grants, denies, and/or provides limited or selective access to secured system 106 according to a scheme of privileges enforced by an authorization module 105. By way of a non-limiting example, authorization module 105 recognizes categories of users and assigns privileges to each category based on, for example, a role-based scheme define by, for example, relationships, permissions, levels of authorization, user characteristics, and any combination thereof. Privileges may attach automatically, for example, according to a default setting or policy. Privileges may be assigned according to a default, for example, based on user status and/or assigned manually by, for example, a system administrator at administrator node 111.

By way of a non-limiting example, target user 102 may have privileges to access sensitive information located on secured system 106 and may further have authorization to perform other tasks on secured system 106, such as, for example, creating new objects, altering structures, inserting or adding data, updating data, deleting data, selecting data, viewing data, and/or executing procedures. If, for example, an entity other than an authorized user is authenticated and authorized to exercise such privileges, security vulnerabilities may arise.

In an exemplary embodiment, enterprise network 100 includes one or more administrator nodes 111 capable of interacting with enterprise network 100 resources, systems, and information assets, such as, for example, secured system 106, security module 103, and/or any other data domain within the scope of authority assigned to a given administrator node 111.

In an exemplary embodiment, administrator nodes 111 may set, reset, or clear passwords, such as, for example, password 108 associated, in combination with username 107, with target user 102. Administrator nodes 111 may be tasked with changing passwords as part of a security protocol and/or role description. By way of a non-limiting example, administrator node 111 writes, overwrites, or sets to null password 108 by exercising an administrative privilege associated with its role as a system administrator at administrator node 111.

The changed password 108 is stored in a form capable of verification by authentication module 104.

In an exemplary embodiment, administrator node 111 initiates a password change cycle when, for example, password confidentiality has been compromised and/or a security risk has been identified. Such a password change cycle may be initiated automatically, for example, upon execution of a security protocol, by an automated trigger, by a routine, and any combination thereof. A password change cycle may be initiated by security module 103 and/or any security protocol operating within the environment of enterprise network 100. A password change cycle may be initiated automatically, semi-automatically, or manually upon the direction or suggestion of, for example, target user 102, administrator node 111, or any authorized entity capable of interacting with enterprise network 100.

In a non-limiting example, security module 103 initiates a password change cycle upon receiving notification of, for example, irregular login activity, a security threat, and/or any trigger, such as, for example, execution of a security protocol or policy instructing users to change passwords. By way of example, not of limitation, target user 102 may initiate a password change cycle upon realizing that the confidentiality of password 108 has been compromised or upon forgetting password 108. A security protocol may dictate that password 108 must be changed. Administrator nodes 111 may be tasked with initiating and completing one or more password change cycles.

In an exemplary embodiment, a password change cycle involves use of a multi-control password changing module 112. One skilled in the relevant arts will understand that client 101, security module 103, and multi-control password changing module 112 may share a same physical server or a distributed server as separate software components and/or may even be compiled as a single combined application. Therefore, it is understood that client 101, security module 103, and multi-control password changing module 112 may be disposed in a number of different locations within and throughout enterprise network 100, and are shown as separate modules in FIGS. 1 through 4 by way of example, not of limitation.

In an exemplary embodiment, a multi-control password changing module 112 includes, or is otherwise communicatively coupled to, a recruitment module 113, a regulation module 114, a change value module 115, and a transmission module 116. Multi-control password changing module 112 may be enabled when target user 102 selects multi-control password changing as an option and/or a user setting associated with a login policy. Target user 102 may, for example, select a multi-control password changing option even when, for example, one or more default settings indicate that multi-control password changing is not enabled.

Figure 2:
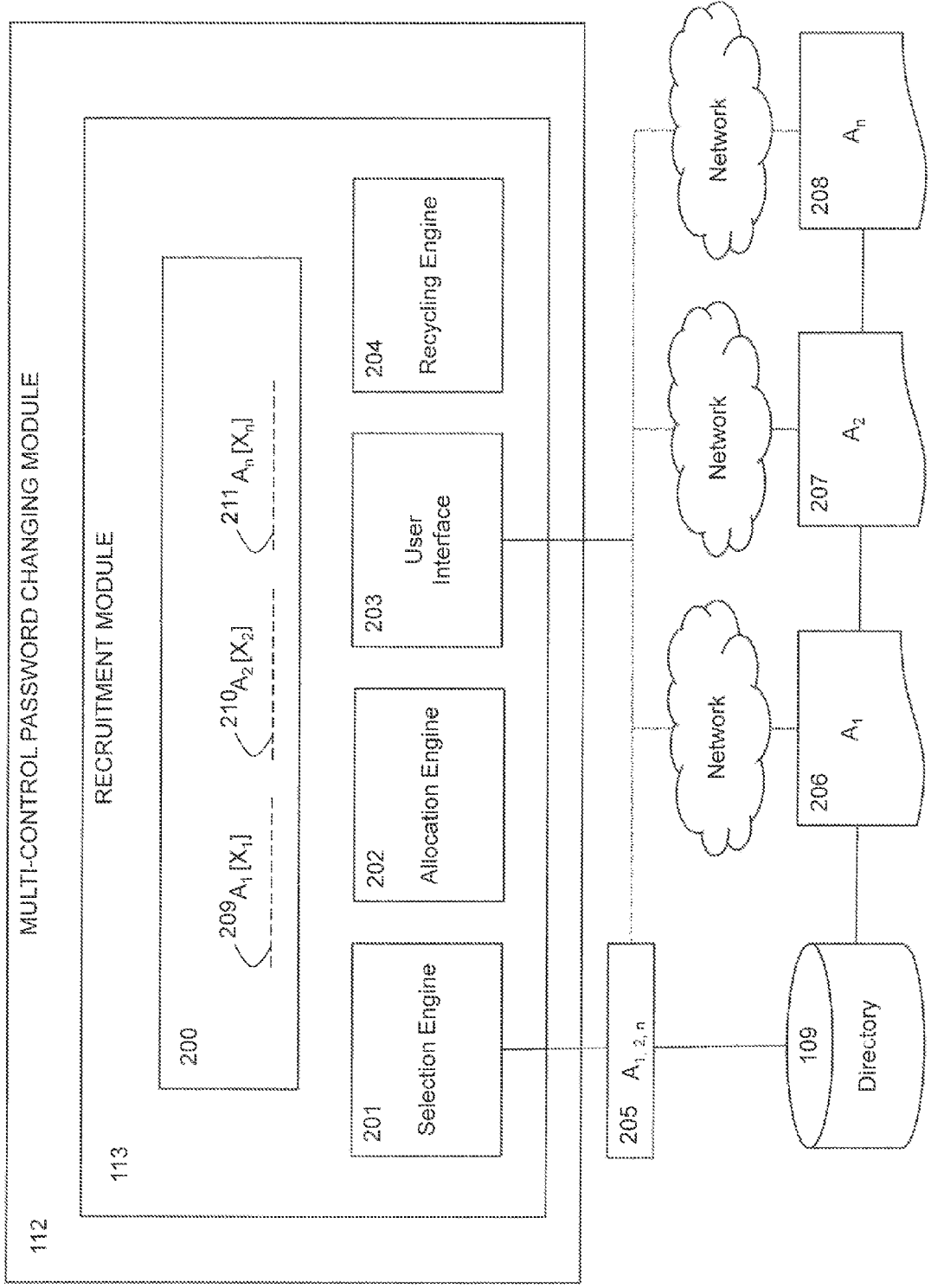
FIG. 2 is a detailed block diagram of the system of FIG. 1, illustrating a multi-control password changing module and a recruitment module, in accordance with an exemplary embodiment.

According to an exemplary embodiment, multi-control password changing includes recruiting a plurality of administrator nodes 111 to complete a password change cycle, as illustrated in FIG. 2.

In an exemplary embodiment, a recruitment module 113 selects a plurality of administrator nodes 111, for example, from a directory 109. A selection engine 201 may randomly identify a plurality of administrator nodes 111 which are, for example, indexed in directory 109. Selection engine 201 may execute logic and/or apply criteria relevant for generating a selection 205 of administrator nodes 111.

In an exemplary embodiment, selection 205 defines a group or subset of administrator nodes 111, such as, for example, administrator nodes 206, 207, and 208. Selection 205 processes queries performed by, for example, selection engine 201. Selection 205 is configured to process associated data as well as determine and assign password change tasks to administrator nodes 206, 207, and 208 based on criteria, such as, for example, availability, authorization, and/or workflow.

According to an exemplary embodiment, selection engine 201 generates selection 205 of administrator nodes 206, 207, and 208, selected randomly or non-randomly from directory 109. Selection 205 of administrator nodes 206, 207, and 208 may be qualified by criteria. For example, in applying criteria to generate a selection 205, selection engine 201 may specify, restrict, and/or filter results from a targeted query of directory 109. In a non-limiting example, an administrator node 111, known within directory 109 to be absent, busy, or otherwise indisposed, may be excluded from selection 205 by such criteria. Administrator nodes 111 may also be excluded from selection 205 for ineligibility, lack of preference, lack of privilege, and/or as recognized to have participated in a password change cycle immediately prior to recruitment, as well as other criteria for exclusion.

By way of a non-limiting example, selection engine 201 queries directory 109 and returns a list and/or index of administrator nodes 111 available to change password values for target user 102, such as, for example, administrator nodes 206, 207, and 208, illustrated in FIG. 2. Administrator nodes 206, 207, and 208 may be selected at random from directory 109. Administrator nodes 206, 207, and 208 may volunteer to change passwords, for example, in response to an inquiry and/or instruction from target user 102 and/or an authorized entity. Administrator nodes 206, 207, and 208 may indicate preference and/or availability in directory 109 to be positively returned in queries by selection engine 201 for inclusion in selection 205. Administrator nodes 206, 207, and 208 may initiate interaction with recruitment module 113 by, for example, affirmatively inputting password values into a user interface 203. Recruitment module 113 may dictate a method by which selection engine 201 executes logic and/or applies criteria for determining which of administrator nodes 111 indexed in directory 109 may be included in selection 205, for example, based on security protocols, workflow constraints, and/or any relevant enterprise management considerations.

According to an exemplary embodiment, multi-control password changing includes allocating password part spaces in an array 200, illustrated in FIG. 2.

In an exemplary embodiment, an allocation engine 202 generates an array 200 of password part spaces, for example, password part spaces, 209, 210, and 211, which are capable of storing data comprising the multiple parts of a multi-control password 300. Password part spaces 209, 210, and 211 may be subject to requirements, limits, restrictions, and/or constraints on, for example, size, length, type, value, complexity, and/or any criteria relevant to formulating a multi-control password 300. Allocation engine 202 may, for example, set maximum and/or minimum password part lengths and/or byte allowances for password part spaces 209, 210, and 211. Allocation engine 202 may provide different allowances for different password part spaces or provide equal allowances for different password part spaces, consistent with the formulation of a multi-control password 300.

In a non-limiting example, allocation engine 202 generates an array 200 and allocates a space of, for example, 255 bytes for password part spaces 209 and 210. Allocation engine 202 further sets a maximum password part input size to 127 bytes or less for both password part spaces 209 and 210.

In an exemplary embodiment, an allocation engine 202 allocates the space between a plurality of administrator nodes 111, for example, administrator nodes 206, 207, and 208, illustrated in FIG. 2.

In an exemplary embodiment, array 200 is inaccessible and/or invisible to administrator nodes 206, 207, and 208 and remains securely obscured and/or encrypted. By way of example, not of limitation, selection 205 of administrator nodes 206, 207, and 208 are blinded to processing performed by recruitment module 113, selection engine 201, allocation engine 202, and/or with respect to array 200. By way of a non-limiting example, administrator nodes 206, 207, and 208 are recruited to populate respective password part spaces 209, 210, and 211. Administrator nodes 206, 207, and 208 are blinded to each other and/or otherwise restricted from knowing or discovering the other recruited administrator nodes of selection 205. For example, administrator node 206 receives an order to enter a password part input value not to exceed 127 bytes into user interface 203, however, administrator node 206 does not know it has been recruited along with administrator nodes 207 and 208 as part of selection 205 because recruitment module 113 blinds administrator 206.

Figure 3:
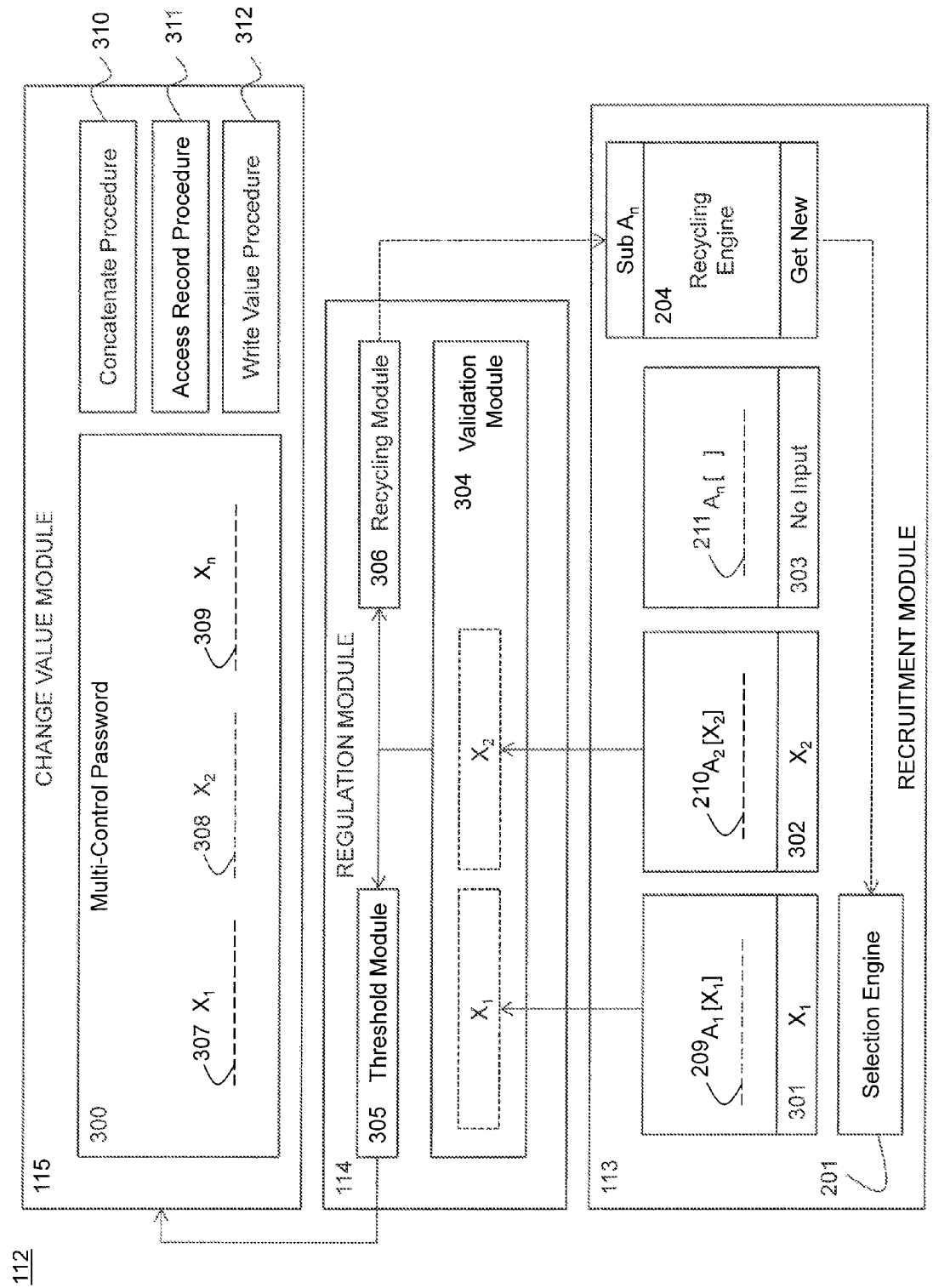
FIG. 3 is a diagram illustrating a recruitment module, a regulation module, and a change value module, in accordance with an exemplary embodiment.

In an exemplary embodiment, selection 205 of administrator nodes 206, 207, and 208 generates a multi-control password 300, illustrated in FIG. 3.

In an exemplary embodiment, administrator nodes 206, 207, and 208 provide password part inputs 301, 302, and 303 to password part spaces 209, 210, and 211, respectively, by interacting with a user interface 203. Administrator nodes 206, 207, and 208 may access user interface 203 remotely, for example, at any node on enterprise network 100. User interface 203 is location independent such that components of user interface 203 may be accessed by administrator nodes 206, 207, and 208 at distributed locations. By way of a non-limiting example, administrator nodes 206, 207, and 208 populate password part spaces 209, 210, and 211 by entering data into one or more fields made available by user interface 203, representing password part inputs 301, 302, and 303. User interface 203 may be configured to populate password part spaces 209, 210, and 211 with corresponding password part inputs 301, 302, and 303.

In accordance with an exemplary embodiment, user interface 203 prompts administrator nodes 206, 207, and 208 to populate password part spaces 209, 210, and 211 independently. User interface 203 generates notifications directed to each of administrator nodes 206, 207, and 208, such as, for example, as invitations to input password part inputs 301, 302, and 303 into one or more fields provided by user interface 203. Password part inputs 301, 302, and 303, input by administrator nodes 206, 207, and 208 into user interface 203, populate password part spaces 209, 210, and 211. User interface 203 may process confirmation of completion of a population task and/or provide additional prompts to an administrator node, for example, administrator node 208, where a password part input 303 has not been provided, as illustrated in FIG. 3.

In accordance with an exemplary embodiment, user interface 203 maps password parts input 301, 302, and 303 to the corresponding password part space 209, 210, and 211 designated in array 200. User interface 203 may also enforce constraints set by allocation engine 202, such as, for example, length and/or byte allowances. User interface 203 may notify administrator nodes 206, 207, and/or 208 in the event one or more password part inputs 301, 302, and/or 303 do not meet password part lengths and/or byte allowances set by allocation engine 202. User interface 203 may enforce blinding restrictions to prevent and/or minimize risk that administrator nodes 206, 207, and 208 know or discover each other or password parts entered by other administrator nodes. User interface 203 may also provide alerts and/or notifications, for example, in order to coordinate, expedite, or facilitate efficient completion of a password change cycle while preserving anonymity and blinding restrictions within selection 205.

In an exemplary embodiment, administrator nodes 206, 207, and 208 of selection 205 participate in a password change cycle by inputting password part inputs 301, 302, and 303 into user interface 203 without discovering the identity of other administrator nodes 206, 207, and 208 and without discovering the value of inputs by other administrator nodes 206, 207, and 208. By way of example and not limitation, selection engine 201 selects administrator node 206 in combination with administrator nodes 207 and 208 as selection 205. Administrator node 206 may input password part input 301 into user interface 203. User interface 203 may provide notification alerting administrator node 206 that password part input 301 complies or does not comply with constraints set by allocation engine 202. In this non-limiting example, administrator node 206 does not know and is prevented from discovering that administrator nodes 207 and 208 have provided password part inputs 302 and 303 because user interface 203 blinds administrator node 206.

By way of a non-limiting example, methods of blinding and/or preserving anonymity of administrator nodes 206, 207, and 208 in multi-control password changing module 112 may include locking, encrypting, masking, returning null values, denying access, and/or any method of securing information. For example, user interface 203 may include form elements for password part inputs 301, 302, and 303 in combination with masking elements capable of restricting access to information related to processing performed by recruitment module 113, selection engine 201, allocation engine 202, and/or with respect to array 200.

According to an exemplary embodiment, multi-control password changing includes regulating password part inputs 301, 302, and 303, for example, with respect to meeting a threshold sufficiency. Multi-control password changing may include recycling a password change cycle until, for example, a multi-control password 300 has been successfully formulated, as illustrated in FIG. 3.

In accordance with an exemplary embodiment, a regulation module 114: validates password part inputs 301 and 302 provided by administrator nodes 206 and 207; determines whether a threshold sufficiency of password parts has been input; and recycles until a password change cycle is successfully completed.

In a non-limiting example, administrator nodes 206 and 207 successfully input password part inputs 301 and 302 into user interface 203, which populates corresponding password part spaces 209 and 210 designated in array 200.

In accordance with an exemplary embodiment, validation module 304 processes password part inputs 301 and 302 provided to password part spaces 209 and 210. Validation module 304 passes password part inputs 301 and 302 to a threshold module 305, configured to determine whether a threshold sufficiency of password part inputs have been provided to complete a password change cycle. In a non-limiting example, password part input 303 contains no input and therefore, upon validation by validation module 304, is determined by threshold module 305 not to be sufficient. Failure to pass threshold module 305 for insufficiency causes a recycling module 306 to initiate a reselection process by causing a recycling engine 204 to substitute unresponsive administrator node 208. Recycling engine 204 causes selection engine 201 to reinitiate recruiting of one or more substitute administrator nodes 111, for example from directory 109, to join selection 205 in order to provide a substitute password part input 303.

By way of example and not limitation, if a null value or no value exists at, for example, password part inputs 301, 302, and/or 303, regulation module 114 reinitiates a password change cycle and/or causes recycling module 306 to initiate a reselection process until the password change cycle completes. In a non-limiting example, target user 102 may be denied access to secured system 106 while the password change cycle is pending completion. To permit a target user 102 to gain access to secured system 106 during the pendency of a password change cycle, authentication module 104 may be configured to recognize pre-cycle password 108 while a password change cycle remains pending.

In an exemplary embodiment, upon satisfying the conditions of validation module 304, e.g., as sufficient to pass threshold module 305, password part inputs 301, 302, and 303 are processed by a change value module 115 which formulates a multi-control password 300. Multi-control password 300 comprises multiple password parts represented as 307, 308, and 309. Multi-control password 300 is capable of replacing a pre-password change cycle stored value of password 108 or being stored as separate values for password 108 for purposes of authentication, upon being processed by change value module 115 and being transmitted by a transmission module 116, shown in FIG. 4. Authentication module 104 may be configured to authenticate target user 102 by single multi-control password 300 when it replaces a pre-password change cycle stored value of password 108. Authentication module 104 may also be configured to authenticate target user 102 by password parts 307, 308, and 309, such as, for example, when password parts 307, 308, and 309 are stored separately to replace a pre-password change cycle stored value of password 108. If, for example, both a pre-password change cycle stored value of password 108 as well as a changed password 108 exists, then target user 102 may be authenticated with changed password 108. If target user 102 is successfully authenticated, then the pre-password change cycle stored value of password 108 may be replaced with the changed password 108.

Figure 4:
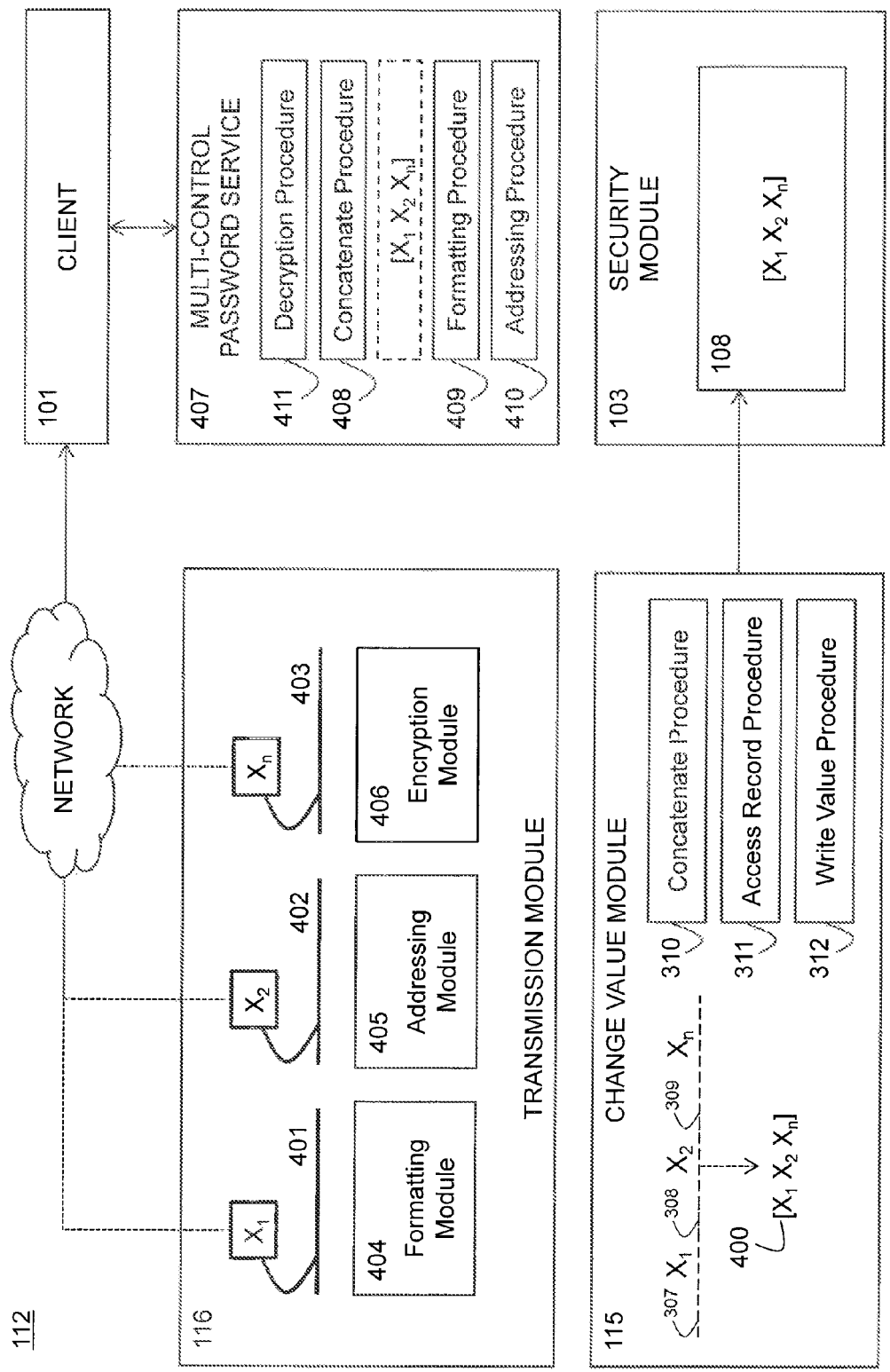
FIG. 4 is a diagram illustrating a multi-control password changing module, a security module, a change value module, a transmission module, and a service, in accordance with an exemplary embodiment.

In accordance with an exemplary embodiment, change value module 115 includes a concatenate procedure 310, an access record procedure 311, and a write value procedure 312, shown in FIG. 4. In a non-limiting example, password parts 307, 308, and 309 are concatenated by concatenate procedure 310 to yield a single password value 400, suitable for replacing the pre-password change cycle stored value of password 108. Access record procedure 311 generates and/or processes any commands necessary to access the active record of authentication module 104 where password 108 is stored. By way of a non-limiting example, single password value 400 is written by write value procedure 312 to the active record or non-active record for authentication module 104. In an exemplary embodiment, write value procedure 312 replaces the pre-password change cycle value of password 108 with single password value 400. In an exemplary embodiment, password parts 307, 308, and 309 are written separately by write value procedure 312 to the active or non-active record, thereby allowing authentication module 104 to authenticate each password part separately. In an exemplary embodiment, password parts 307, 308, and 309 are stored and encrypted separately for authentication by authentication module 104.

In an exemplary embodiment, multi-control password changing includes transmitting single password value 400 or multiple password parts 307, 308, and 309 to target user 102, shown in FIG. 4.

In an exemplary embodiment, transmission module 116 is configured to transmit password parts 307, 308, and 309 to target user 102 and may notify target user 102 of the password change. Transmission module 116 includes a formatting module 404, an addressing module 405, and an encryption module 406. By way of example and not limitation, formatting module 404 transforms password parts 307, 308, and 309 into transmission packets 401, 402, and 403. Transmission packets 401, 402, and 403 are configured to be passed from transmission module 116 to the target user 102 associated with username 107. Addressing module 405 populates and/or applies addressing information associated with target user 102 to transmission packets 401, 402, and 403 capable of enabling their transmission via electronic mail, messaging, and/or in any physical or tangible form, such as, for example, paper in an envelope addressed to the mailing address of target user 102.

In an exemplary embodiment, encryption module 406 securely encodes and/or encrypts transmission packets 401, 402, and 403. Encryption module 406 is configured to secure the contents of transmission packets 401, 402, and 403 by converting data encoding password parts 307, 308, and 309 into a form not easily decoded by unauthorized entities, such as, for example, ciphertext.

In an exemplary embodiment, upon receipt of transmission packets 401, 402, and 403, client 101 dispatches transmission packets 401, 402, and 403 for processing by a multi-control password service 407, as shown in FIG. 4. Multi-control password service 407 returns single password value 400 or multiple password parts 307, 308, and 309 to target user 102 which matches changed password 108 as replaced or stored separately by change value module 115.

In an exemplary embodiment, processing steps performed by multi-control password service 407 on transmission packets 401, 402, and 403 may include a concatenate procedure 408, a formatting procedure 409, an addressing procedure 410, and a decryption procedure 411. In a non-limiting example, packets 401, 402, and 403 dispatched to multi-control password service 407 are: decrypted by decryption procedure 411 which is configured to reverse any security applied to transmission packets 401, 402, and 403 by, for example, encryption module 406; concatenated by concatenate procedure 408 to generate a single password value 400 or multiple password parts 307, 308, and 309; formatted for transmission by formatting procedure 409 in order to present target user 102 with an intuitive representation of single password value 400 or multiple password parts 307, 308 and 309, for example, by providing target user 102 with a default and/or custom narrative explanation of the contents of the transmission; and addressed to target user 102 by addressing procedure 410, which populates and/or applies addressing information associated with target user 102, capable of enabling the transmission of single password value 400 or multiple password parts 307, 308 and 309 via electronic mail, messaging, and/or in any physical or tangible form.

In an exemplary embodiment, upon receipt of multiple password parts 307, 308, and 309 and/or single password value 400 target user 102 is instructed to and/or required to login to secured system 106 by providing username 107 and changed password 108 to security module 103 and, upon successful login, change password 108 to a value known only to the target user 102.

Figure 5:
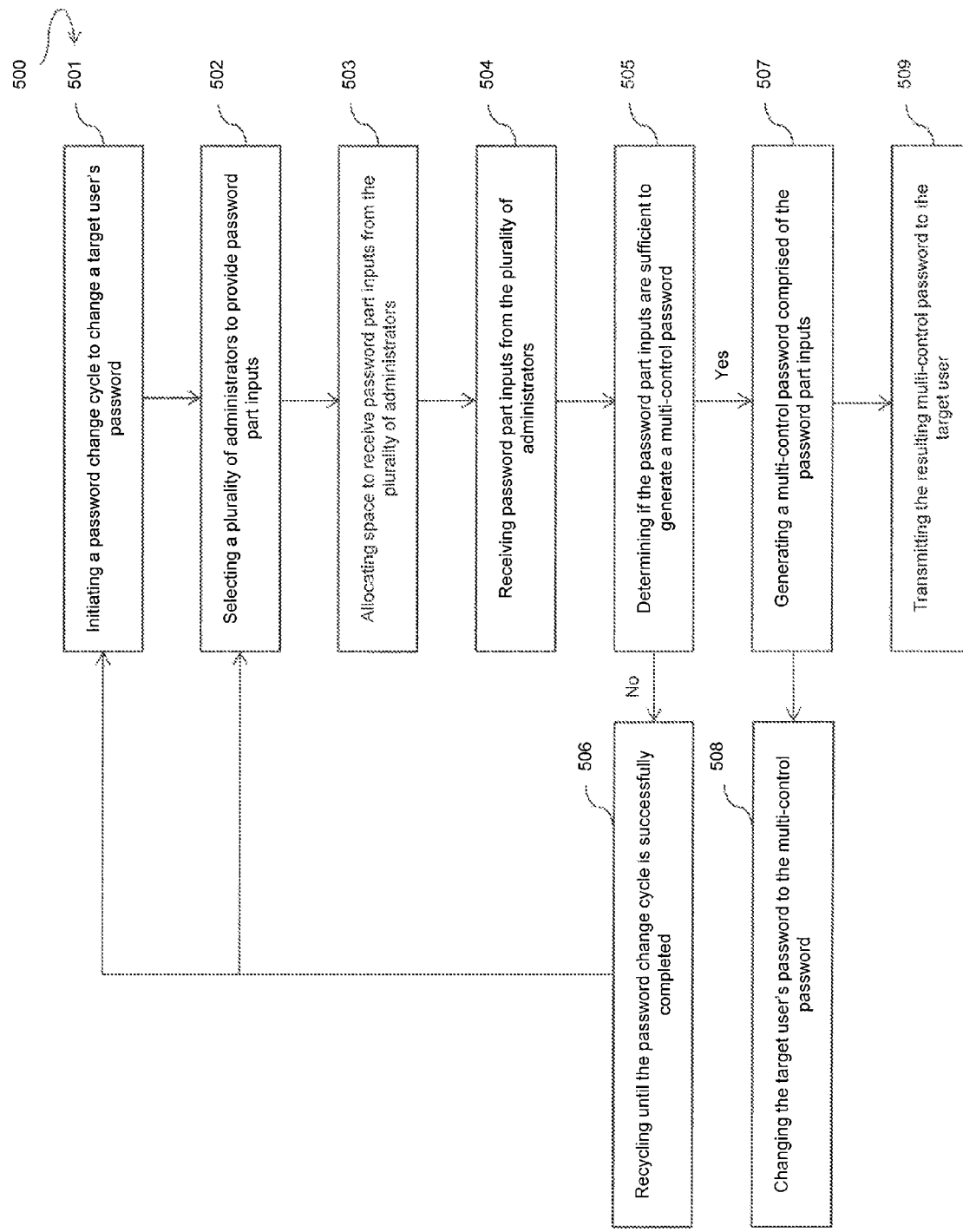
FIG. 5 is a flowchart illustrating a method for multi-control password changing, in accordance with an exemplary embodiment.

FIG. 5 shows a flow diagram illustrating an exemplary method for multi-control password changing, in accordance with an exemplary embodiment.

Method 500 begins at step 501, when a password change cycle to change a target user's password is initiated.

In an exemplary embodiment, in step 501, target user 102 requests the initiation of a password change cycle upon realizing that the confidentiality of password 108 has been compromised or target user 102 has forgotten his or her password 108. In an exemplary embodiment, administrator node 111 initiates a password change cycle when password confidentiality has been compromised and/or a security risk has been identified. A password change cycle may be initiated by security module 103 and/or any security protocol operating within the environment of enterprise network 100. A password change cycle may be initiated automatically, semi-automatically, or manually upon the direction or suggestion of, for example, target user 102, administrator node 111, or any authorized entity capable of interacting with enterprise network 100.

In a non-limiting example, security module 103 initiates a password change cycle upon receiving notification of, for example, irregular login activity, a security threat, and/or any trigger, such as, for example, execution of a security protocol or policy instructing users to change passwords. By way of non-limiting example, target user 102 may initiate a password change cycle upon realizing that the confidentiality of password 108 has been compromised. A security protocol may dictate that password 108 must be changed. Administrator nodes 111 may be tasked with initiating and completing one or more password change cycles.

In an exemplary embodiment, a password change cycle involves use of a multi-control password changing module 112.

At step 502, selection engine 201 selects a plurality of administrators to provide password part inputs.

In an exemplary embodiment, in step 502, recruitment module 113 selects a plurality of administrator nodes 111 from a directory 109. A selection engine 201 may randomly identify a plurality of administrator nodes 111 which are, for example, indexed in directory 109. Selection engine 201 may execute logic and/or apply criteria relevant for generating a selection 205 of administrator nodes 111.

According to an exemplary embodiment, selection engine 201 generates selection 205 of administrator nodes 206, 207, and 208, selected randomly or non-randomly from directory 109. By way of a non-limiting example, selection engine 201 queries directory 109 and returns a list and/or index of administrator nodes 111 available to change password values for target user 102, such as, for example, administrator nodes 206, 207, and 208. Recruitment module 113 may dictate a method by which selection engine 201 executes logic and/or applies criteria for determining which of administrator nodes 111 indexed in directory 109 may be included in selection 205, for example, based on security protocols, workflow constraints, and/or any relevant enterprise management considerations.

At step 503, allocation engine 202 allocates space to receive password part inputs from the plurality of administrators.

In an exemplary embodiment, in step 503, allocation engine 202 generates an array 200 of password part spaces, for example, password part spaces, 209, 210, and 211, capable of storing data comprising the multiple parts of multi-control password 300. Allocation engine 202 may set maximum and/or minimum password part lengths and/or byte allowances for password part spaces 209, 210, and 211. Allocation engine 202 may provide different allowances for different password part spaces or provide equal allowances for different password part spaces, consistent with the formulation of a multi-control password 300.

In an exemplary embodiment, an allocation engine 202 allocates the space between a plurality of administrator nodes 111, for example, administrator nodes 206, 207, and 208, illustrated in FIG. 2.

In an exemplary embodiment, array 200 is inaccessible and/or invisible to administrator nodes 206, 207, and 208 and remains securely obscured. By way of example, not of limitation, selection 205 of administrator nodes 206, 207, and 208 are blinded to processing performed by recruitment module 113, selection engine 201, allocation engine 202, and/or with respect to array 200.

At step 504, a plurality of administrators to provide password part inputs to recruitment module 113.

In an exemplary embodiment, in step 504, administrator nodes 206, 207, and 208 provide password part inputs 301, 302, and 303 to password part spaces 209, 210, and 211, respectively, by interacting with user interface 203. By way of a non-limiting example, administrator nodes 206, 207, and 208 populate password part spaces 209, 210, and 211 by entering data into one or more fields made available by user interface 203, representing password part inputs 301, 302, and 303. User interface 203 may be configured to populate password part spaces 209, 210, and 211 with corresponding password part inputs 301, 302, and 303.

In accordance with an exemplary embodiment, user interface 203 prompts administrator nodes 206, 207, and 208 to populate password part spaces 209, 210, and 211 independently. User interface 203 generates notifications directed to each of administrator nodes 206, 207, and 208, such as, for example, as invitations to input password part inputs 301, 302, and 303 into one or more fields provided by user interface 203. User interface 203 may process confirmation of completion of a population task and/or provide additional prompts to an administrator node, for example, administrator node 208, where a password part input 303 has not been provided, as illustrated in FIG. 3.

In accordance with an exemplary embodiment, user interface 203 maps password parts input 301, 302, and 303 to the corresponding password part space 209, 210, and 211 designated in array 200. User interface 203 may also enforce constraints set by allocation engine 202. User interface 203 notifies administrator nodes 206, 207, and/or 208 in the event one or more password part inputs 301, 302, and/or 303 do not meet password part lengths and/or byte allowances set by allocation engine 202. User interface 203 may enforce blinding restrictions to prevent and/or minimize risk that administrator nodes 206, 207, and 208 know or discover each other. User interface 203 provides alerts and notifications in order to coordinate, expedite, or facilitate efficient completion of a password change cycle while preserving anonymity and blinding restrictions within selection 205.

In an exemplary embodiment, administrator nodes 206, 207, and 208 of selection 205 participate in a password change cycle by inputting password part inputs 301, 302, and 303 into user interface 203 without discovering the identity of other administrator nodes 206, 207, and 208 and without discovering the value of inputs by other administrator nodes 206, 207, and 208.

At step 505, regulation module 114 determines if the password part inputs are sufficient to generate a multi-control password.

In an exemplary embodiment, in step 505, multi-control password changing includes regulating password part inputs 301, 302, and 303 with respect to meeting a threshold sufficiency. Multi-control password changing includes recycling a password change cycle until, for example, a multi-control password 300 has been successfully formulated. In a non-limiting example, administrator nodes 206 and 207 successfully input password part inputs 301 and 302 into user interface 203, which populates corresponding password part spaces 209 and 210 designated in array 200. Validation module 304 processes password part inputs 301 and 302 provided to password part spaces 209 and 210. Validation module 304 passes password part inputs 301 and 302 to threshold module 305, configured to determine whether a threshold sufficiency of password part inputs have been provided to complete a password change cycle.

In accordance with an exemplary embodiment, a regulation module 114: validates password part inputs 301 and 302 provided by administrator nodes 206 and 207; determines whether a threshold sufficiency of password parts has been input; and recycles until a password change cycle is successfully completed.

At step 506, recycling module 306 and recycling engine 204 recycle until the password change cycle is successfully completed.

In an exemplary embodiment, in step 506, failure to pass threshold module 305 for insufficiency causes recycling module 306 to initiate a reselection process by causing recycling engine 204 to substitute unresponsive administrator node 208. Recycling engine 204 causes selection engine 201 to reinitiate recruiting of one or more substitute administrator nodes 111, for example from directory 109, to join selection 205 in order to provide a substitute password part input 303.

By way of example and not limitation, if a null value or no value exists at, for example, password part inputs 301, 302, and/or 303, regulation module 114 reinitiates a password change cycle and/or causes recycling module 306 to initiate a reselection process until the password change cycle completes. In a non-limiting example, target user 102 may be denied access to secured system 106 while the password change cycle is pending completion. To permit a target user 102 to gain access to secured system 106 during the pendency of a password change cycle, authentication module 104 may be configured to recognize pre-cycle password 108 while a password change cycle remains pending.

At step 507, change value module 115 generates a single multi-control password comprised of the password part inputs and/or stores multiple password part inputs separately for authentication.

In an exemplary embodiment, in step 507, upon satisfying the conditions of validation module 304, password part inputs 301, 302, and 303 are processed by change value module 115 which formulates a multi-control password 300 or stores multiple password parts 307, 308, and 309 separately.

In an exemplary embodiment, multi-control password 300 is comprised of multiple password parts 307, 308, and 309. Multi-control password 300 is capable of replacing a pre-password change cycle stored value of password 108, e.g., for purposes of authentication, upon being processed by change value module 115. Password parts 307, 308, and 309 are capable of replacing a pre-password change cycle stored value of password 108 and may be stored separately.

In accordance with an exemplary embodiment, change value module 115 includes a concatenate procedure 310, an access record procedure 311, and a write value procedure 312, shown in FIG. 4. In a non-limiting example, password parts 307, 308, and 309 are concatenated by concatenate procedure 310 to yield a single password value 400, suitable for replacing the pre-password change cycle stored value of password 108.

At step 508, change value module 115 changes the target user's password to the single multi-control password or multiple password parts.

In an exemplary embodiment, in step 508, single password value 400 or multiple password parts 307, 308, and 309 are written by write value procedure 312 to the active record or non-active record for authentication module 104 to be stored as password 108. Write value procedure 312 replaces the pre-password change cycle stored value with single password value 400 or multiple password parts 307, 308, and 309, which may be stored separately.

At step 509, transmission module 116 transmits the resulting multi-control password and/or multiple password parts to the target user.

In accordance with an exemplary embodiment, in step 509, transmission module 116 is configured to transmit password parts 307, 308, and 309 to target user 102 and may notify target user 102 of the password change. Transmission module 116 includes a formatting module 404, an addressing module 405, and an encryption module 406. By way of example and not limitation, formatting module 404 transforms password parts 307, 308, and 309 into transmission packets 401, 402, and 403. Transmission packets 401, 402, and 403 are configured to be passed from transmission module 116 to the target user 102 associated with username 107. Addressing module 405 populates and/or applies addressing information associated with target user 102 to transmission packets 401, 402, and 403 capable of enabling their transmission via electronic mail, messaging, and/or in any physical or tangible form, such as, for example, paper in an envelope addressed to the mailing address of target user 102.

In an exemplary embodiment, encryption module 406 securely encodes and/or encrypts transmission packets 401, 402, and 403. Encryption module 406 is configured to secure the contents of transmission packets 401, 402, and 403 by converting data encoding password parts 307, 308, and 309 into a form not easily decoded by unauthorized entities, such as, for example, ciphertext.

In an exemplary embodiment, upon receipt of transmission packets 401, 402, and 403, client 101 dispatches transmission packets 401, 402, and 403 for processing by a multi-control password service 407, as shown in FIG. 4. Multi-control password service 407 returns single password value 400 or multiple password parts represented as 307, 308, and 309 to target user 102 which matches changed password 108 as replaced or stored separately by change value module 115.

In an exemplary embodiment, processing steps performed by multi-control password service 407 on transmission packets 401, 402, and 403 may include a concatenate procedure 408, a formatting procedure 409, an addressing procedure 410, and a decryption procedure 411. In a non-limiting example, packets 401, 402, and 403 dispatched to multi-control password service 407 are: decrypted by decryption procedure 411 which is configured to reverse any security applied to transmission packets 401, 402, and 403 by, for example, encryption module 406; concatenated by concatenate procedure 408 to generate a single password value 400 or multiple password parts represented as 307, 308, and 309; formatted for transmission by formatting procedure 409 in order to present target user 102 with an intuitive representation of single password value 400 or multiple password parts 307, 308, and 309, for example, by providing target user 102 with a default and/or custom narrative explanation of the contents of the transmission; and addressed to target user 102 by addressing procedure 410, which populates and/or applies addressing information associated with target user 102, capable of enabling the transmission of single password value 400 or multiple password parts 307, 308, and 309 via electronic mail, messaging, and/or in any physical or tangible form.

In an exemplary embodiment, upon receipt of multiple password parts 307, 308, and 309 and/or single password value 400 target user 102 is instructed to and/or required to login to secured system 106 by providing username 107 and changed password 108 to security module 103 and, upon successful login, change password 108 to a value known only to the target user 102.

Figure 6:
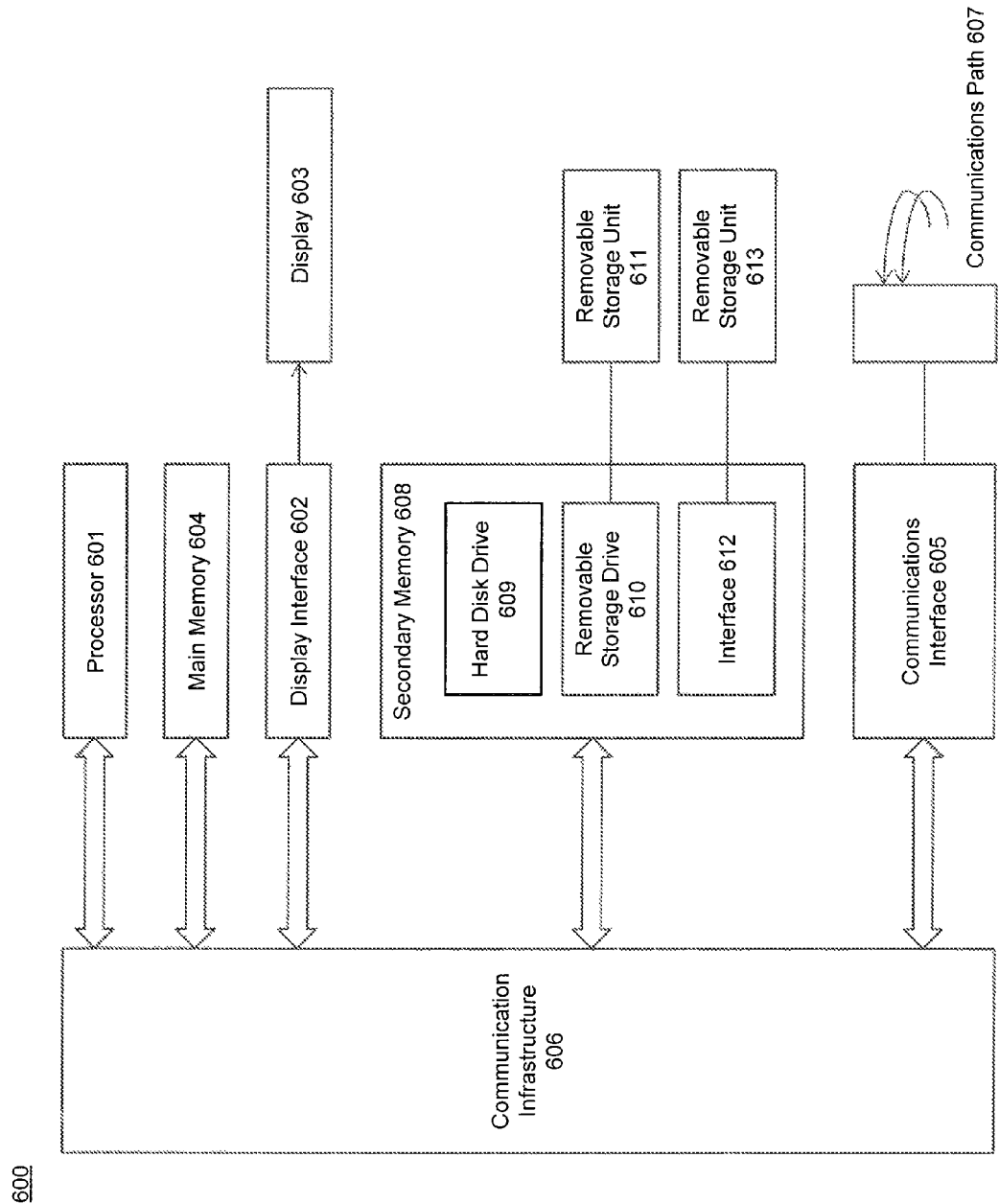
FIG. 6 is a diagram illustrating a computer system, in accordance with an exemplary embodiment.

In an exemplary embodiment, the system and components of embodiments described, herein are implemented using one or more computer systems, such as, for example, computer system 600, shown in FIG. 6.

Computer system 600 includes one or more processors (also called central processing units, or CPUs), such as a processor 601. Processor 601 is connected to a communication infrastructure 606. Computer system 600 also includes a main or primary memory 604, such as random access memory (RAM). Main memory 604 has stored control logic (computer software), and data.

Computer system 600 may include secondary memory 608. Secondary memory 608 may include, for example, a hard disk drive 609 and/or a removable storage device or drive 610, as well as other types of storage devices, such as memory cards and memory sticks. Removable storage drive 610 may represent a floppy disk drive, a magnetic tape drive, a compact disk drive, an optical storage device, tape backup, etc. Removable storage drive 610 may interact with a removable storage unit 611. Removable storage unit 611 may include a computer usable and/or readable storage medium having stored thereon computer software (control logic) and/or data. Removable storage unit 611 may represent a floppy disk, magnetic tape, compact disk, DVD, optical storage disk, or any other computer data storage device. Removable storage drive 610 may read from and/or write to removable storage unit 611 in a well-known manner, as will be appreciated by a person skilled in the relevant art(s). According to an exemplary embodiment, secondary memory 608 may include similar means for allowing computer programs and/or other instructions to be loaded into computer system 600. Such means may include, for example, a removable storage unit 613 and an interface 612. Examples of such means may include a program cartridge and cartridge interface (such as that found in video game devices), a removable memory chip (such as an EPROM, or PROM) and associated socket, and other removable storage units 611 and interfaces 612 which allow software and data to be transferred from the removable storage unit 613 to computer system 600.

Computer system 600 also includes input/output display device 603, such as, for example, monitors, keyboards, pointing devices, etc., which communicate with communication infrastructure 606 through a display interface 602.

Computer system 600 further includes a communication or network interface 605. Communication interface 605 may enable computer system 600 to communicate with remote devices. For example, communication interface 605 may allow computer system 600 to communicate over communications path 607, such as LANs, WANs, the Internet, etc. Communications interface 605 may interface with remote sites or networks via wired or wireless connections.

Control logic may be transmitted to and from computer system 600 via communication path 607.

Any tangible apparatus or article of manufacture comprising a computer useable or readable medium having control logic (software) stored thereon is referred to herein as a computer program product or program storage device. This includes, but is not limited to, computer system 600, main memory 604, secondary memory 608, and removable storage unit 611. Such computer program products, having control logic stored thereon that, when executed by one or more data processing devices, causes such data processing devices to operate as described herein, represent embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

Embodiments may employ any computer useable or readable medium, known now or in the future. Examples of computer useable mediums include, but are not limited to, primary storage devices (e.g., random access memory), secondary storage devices (e.g., such as hard drives, floppy disks, CD ROMs, ZIP disks, tapes, magnetic storage devices, optical storage devices, MEMS, nanotechnological storage device, etc.), and communication mediums (e.g., such as wired and wireless communications networks, local area networks, wide area networks, intranets, etc.).

Reading this disclosure, it will become apparent to a person skilled in the relevant art how to implement these embodiments using other computer systems and/or computer architectures. Embodiments may further operate with software, hardware, and/or operating system implementations other than those described. Therefore, any software, hardware, and operating system implementations suitable for performing the functions described herein can be used.

It is also to be appreciated that the Detailed Description, and not the Summary and Abstract sections, is intended to be used to interpret the claims. The Summary and Abstract sections may set forth one or more but not all exemplary embodiments as contemplated by the inventor, and thus, are not intended be limiting in any way.

Various embodiments are described herein with the aid of functional building blocks for illustrating implementation of specified functions and relationships thereof. The boundaries of these functional building blocks have been arbitrarily defined for the convenience of the description. Alternate boundaries can be defined so long as the specified functions and relationships thereof are appropriately performed.

The foregoing description so fully reveals the general nature of the disclosed embodiments that others can, by applying knowledge within the ordinary skill of the art, readily modify and/or adapt for various applications such specific embodiments, without undue experimentation. Such adaptations and modifications are intended to be within the meaning and range of equivalents of the disclosed embodiments, based on the teaching and guidance presented herein.

It is to be understood that any phraseology or terminology is for the purpose of description and not of limitation, such that the terminology or phraseology of is to be interpreted by one of ordinary skill in the art in light of the teachings and guidance.

The breadth and scope of any of the disclosed embodiments should not be limited by any of the above-described exemplary embodiments, but should be defined only in accordance with the following claims and their equivalents.

What is claimed is:

1. A computer-implemented method, comprising:
    selecting, by at least one hardware processor, a first administrator account from a plurality of administrator accounts to create a first password part input, where the first administrator account is associated with a first administrator node in a network;
    selecting, by the at least one hardware processor, a second administrator account from a plurality of administrator accounts to create a second password part input, where the second administrator account is associated with a second administrator node in the network;
receiving, from the at least one hardware processor, the first password part input from the first administrator account and the second password part input from the second administrator account;
generating, by the at least one hardware processor, a multi-control password comprised the first password part input and the second password part input; and
changing, by the at least one hardware processor, a target user's password to multi-control password.

2. The computer-implemented method of claim 1, further comprising:
allocating space to receive the first and second password part inputs from the first and second administrator accounts.

3. The computer-implemented method of claim 1, further comprising:
determining if the first and second password part inputs are sufficient in at least one of length, type, value, and complexity to generate a multi-control password.

4. The computer-implemented method of claim 1, further comprising:
recycling until a password change cycle comprising the selecting the first administrator account, the selecting the second administrator account, and the receiving is successfully completed.

5. The computer-implemented method of claim 1, further comprising:
transmitting the multi-control password to the target user.

6. The computer-implemented method of claim 5, wherein the transmitting comprises:
transmitting the multi-control password to the target user using a multi-control password service to concatenate, format, and address the first and second password part inputs.

7. The computer-implemented method of claim 1, wherein the receiving comprises:
receiving the first and second password part inputs from the first and second administrator accounts through a user interface configured to enforce password part input requirements.

8. A system, comprising:
a memory comprising:
a multi-control password changing module, implemented on a processing device, configured to change a target user's password,
a recruitment module, implemented on a processing device, configured to:
select a first administrator account from a plurality of administrator accounts to create a first password part input, wherein the first administrator account is associated with first administrator node in a network, and
select a second administrator account from the plurality of administrator accounts to create a second password art input, wherein the second administrator account is associated with a second administrator node in the network;
a regulation module, implemented on a processing device, configured to receive and process the first password part input from the first administrator account and the second password part input from the second administrator account, and
a change value module, implemented on the processing device, configured to generate a multi-control password comprised of the first and second password part inputs; and
at least one processor coupled to the memory and configured to process the modules.

9. The system of claim 8, wherein the memory further comprises:
an allocation module, implemented on a processing device, configured to allocate space to receive the first and second password part inputs from the first and second administrator accounts.

10. The system of claim 8, wherein the memory further comprises:
a transmission module, implemented on the processing device, configured to transmit the multi-control password to a target user.

11. The system of claim 10, wherein the transmission module further comprises:
a multi-control password service configured to concatenate, format, and address the first and second password part inputs.

12. The system of claim 8, wherein the recruitment module further comprises:
a selection engine configured to select the first and second administrators based on qualifying criteria.

13. The system of claim 8, wherein the recruitment module is further configured to:
blind the first administrator from knowing or discovering the identity and the second password part input of the second administrator.

14. The system of claim 8, wherein the regulation module is further configured to:
substitute the first administrator using a selection engine until the first password part input is sufficient in at least one of length, type, value, and complexity to generate the multi-control password.

15. A non-transitory computer-readable storage medium having control logic recorded thereon, execution of which, by a processor, causes the processor to perform operations to perform multi-control password changing, the operations comprising:
selecting a first administrator account from a plurality of administrator accounts to create a first password part input, wherein the first administrator account is associated with a first administrator node in a network;
selecting a second administrator associated with a second administrator account from the plurality of administrator accounts to create a second password part input, wherein the second administrator account is associated with a second administrator node in the network;
receiving the first password part input from the first administrator account and the second password input from the second administrator account;
generating a multi-control password comprised of the first password part input and the second password part input; and
changing a target user's password to the multi-control password.

16. The non-transitory computer-readable storage medium of claim 15, the operations further comprising:
allocating space to receive the first and second password part inputs from the first and second administrator accounts.

17. The non-transitory computer-readable storage medium of claim 15, the operations further comprising:

determining if the first and second password part inputs are sufficient in at least one of length, type, value, and complexity to generate the multi-control password.

18. The non-transitory computer-readable storage medium of claim 15, the operations further comprising:
recycling until a password change cycle comprising the selecting the first administrator account, the selecting the second administrator account, and the receiving is successfully completed.

19. The non-transitory computer-readable storage medium of claim 15, the operations further comprising:
transmitting the multi-control password to the target user.

20. The non-transitory computer-readable storage medium of claim 15, wherein the receiving comprises:
receiving the first and second password part inputs from the first and second administrator accounts through a user interface configured to enforce password part input requirements.

* * * * *